(12) United States Patent
Hintsala (10) Patent No.: US 12,111,407 B2
(45) Date of Patent: Oct. 8, 2024

(54) SYSTEM AND METHOD FOR SCALABLE ASSET TRACKING

(71) Applicant: Silicon Laboratories Inc., Austin, TX (US)

(72) Inventor: Lauri Mikael Hintsala, Jokikunta (FI)

(73) Assignee: Silicon Laboratories Inc., Austin, TX (US)

( * ) Notice: Subject to any disclaimer, the term of this patent is extended or adjusted under 35 U.S.C. 154(b) by 1023 days.

(21) Appl. No.: 17/024,874

(22) Filed: Sep. 18, 2020

(65) Prior Publication Data

US 2022/0091218 A1 Mar. 24, 2022

(51) Int. Cl.
| | |
|---|---|
| *G01S 5/02* | (2010.01) |
| *G01S 5/00* | (2006.01) |
| *G01S 5/08* | (2006.01) |
| *H04L 1/08* | (2006.01) |
| *H04W 4/80* | (2018.01) |
| *H04W 56/00* | (2009.01) |
| *H04W 72/0446* | (2023.01) |

(52) U.S. Cl.
CPC .......... *G01S 5/0215* (2013.01); *G01S 5/0018* (2013.01); *G01S 5/021* (2013.01); *G01S 5/08* (2013.01); *H04L 1/08* (2013.01); *H04W 56/001* (2013.01); *H04W 72/0446* (2013.01); *H04W 4/80* (2018.02)

(58) Field of Classification Search
CPC ....... G01S 5/0215; G01S 5/0018; G01S 5/021
USPC ...... 342/367, 450, 458, 463, 357.21, 357.29
See application file for complete search history.

(56) References Cited

U.S. PATENT DOCUMENTS 11,519,996 B2 * 12/2022 Hui .................. G01S 13/38
2021/0374122 A1 * 12/2021 Chatterjea ............. G16H 40/20

\* cited by examiner

*Primary Examiner* — Bo Fan
(74) *Attorney, Agent, or Firm* — NIELDS, LEMACK & FRAME, LLC (57) ABSTRACT

A system having a locator device and a plurality of tag devices is disclosed. The locator device comprises an antenna array allowing it to determine an angle of arrival for incoming signals from each of the plurality of tag devices. The system also defines a sequence of time slots, where each time slot has a specific function. The sequence may start with a locator time slot, where the locator device transmits a packet that informs all of the tag devices that this is the start of the sequence. A sync slot follows the locator time slot, where new tag devices may transmit a sync request to the locator device. Upon receipt of a sync request, the locator device assigns the new tag device a tag slot. Following the sync slot are a plurality of tag slots, where each tag device transmits an AoA packet during its assigned tag slot.

18 Claims, 8 Drawing Sheets

SYSTEM AND METHOD FOR SCALABLE ASSET TRACKING

FIELD

This disclosure describes systems and methods for allowing a locator device to monitor the angle of arrival from hundreds or even thousands of tag devices.

BACKGROUND

Algorithms for determining the direction of arrival of an incoming wireless signal are well known. These algorithms exploit the difference in phase of the incoming signal at a plurality of antenna elements. For example, a linear antenna array can be formed, where the spacing between adjacent antenna elements is constant. As the incoming signal is received, it will reach the antenna element located closest to the transmitter first. The incoming signal will then reach the other antenna elements in the antenna array based on their distance to the transmitter.

Using the difference in phase, the direction of the transmitter can be estimated. Direction of arrival is important in various applications, such as beacon location, or spatial positioning.

Various wireless protocols, such as Bluetooth, have established special packet formats to allow the angle of arrival of an incoming signal to be calculated. However, these protocols have not considered how a locator device can track hundreds or even thousands of tag devices. Specifically, there is no protocol defined that allows the locator device to receive AoA packets from all of these devices at regular intervals, where the transmissions from the various tag devices do not collide or interfere with one another.

Therefore, it would be beneficial if there were a system, a locator device and a plurality of tag devices that were configured to allow each tag device to transmit an AoA packet to the locator device during a predetermined time slot such that there are few collisions between these packets. Further, it would be advantageous if the locator device could receive AoA packets from hundreds or thousands of tag devices in less than 10 seconds.

SUMMARY

A system having a locator device and a plurality of tag devices is disclosed. The locator device comprises an antenna array allowing it to determine an angle of arrival for incoming signals from each of the plurality of tag devices. The system also defines a sequence of time slots, where each time slot has a specific function. The sequence may start with a locator time slot, where the locator device transmits a packet that informs all of the tag devices that this is the start of the sequence. A sync slot follows the locator time slot, where new tag devices may transmit a sync request to the locator device. Upon receipt of a sync request, the locator device assigns the new tag device a tag slot. Following the sync slot are a plurality of tag slots, where each tag device transmits an AoA packet during its assigned tag slot.

According to one embodiment, a system is disclosed. The system comprises a locator device, comprising a wireless network interface; and a plurality of tag devices, each comprising a wireless network interface; wherein each of the tag devices transmits an AoA packet to the locator device during a designated time slot over a wireless channel. In certain embodiments, the wireless channel is segmented into a sequence of time slots, comprising a locator time slot, a sync slot and a plurality of tag slots, and each of the plurality of tag devices is assigned a specific tag slot by the locator device. In some embodiments, the sequence defines an interval, and the sequence is repeated a plurality of times. In certain embodiments, a length of each designated time slot is defined as a slot duration, and the interval comprises a predetermined number of slot durations. In some embodiments, a length of the locator time slot is the slot duration, and the length of the sync slot is one or more slot durations. In some embodiments, a new tag device, different than the plurality of tag devices, transmits a sync request packet during the sync slot. In some embodiments, the locator device responds to the sync request packet using a sync response packet, wherein the sync response packet includes an assigned tag slot that the new tag device is to utilize to transmit AoA packets to the locator device.

According to another embodiment, a locator device for use with a plurality of tag devices to receive AoA packets from the plurality of tag devices is disclosed. The locator device comprises a wireless network interface; a processing unit; and a memory device in communication with the processing unit, which comprises instructions, which when executed by the processing unit, enable the locator device to: receive an incoming packet from a first of the plurality of tag devices; parse the incoming packet to determine if it is a sync request packet or an AoA packet; and transmit a sync response packet, assigning a designated time slot to the first of the plurality of tag devices if the incoming packet is a sync request. In certain embodiments, the sync response packet comprises an indication of the time from a current time to the start of the designated time slot. In certain embodiments, the memory device comprises instructions, which when executed by the processing unit, enable the locator device to: calculate an angle of arrival of the incoming packet if the incoming packet is an AoA packet. In certain embodiments, the memory device comprises instructions, which when executed by the processing unit, enable the locator device to: if the incoming packet is an AoA packet, determine a difference between a time that the incoming packet was received and a time that the incoming packet was expected to be received; and transmit a locator response packet to the first of the plurality of tag devices, wherein the locator response packet comprises an indication of this difference, defined as clock drift. In some embodiments, the locator response packet instructs the first of the plurality of tag devices to change its designated time slot. In some embodiments, the locator device transmits a locator packet to signify a beginning of an interval, the interval comprising a locator time slot, a sync slot and a plurality of tag slots.

According to another embodiment, a tag device, for use with a locator device is disclosed. The tag device comprises a wireless network interface; a processing unit; and a memory device in communication with the processing unit, which comprises instructions, which when executed by the processing unit, enable the tag device to: monitor a wireless channel for a locator packet; transmit a sync request during a sync slot, following receipt of the locator packet; receive, in response to the sync request, a sync response packet; and parse the sync response packet to determine a designated tag slot during which the tag device transmits an AoA packet. In certain embodiments, the memory device comprises instructions, which when executed by the processing unit, enable the tag device to: transmit the AoA packet during the designated tag slot. In certain embodiments, the memory device comprises instructions, which when executed by the processing unit, enable the tag device to reset a timer after transmitting the AoA packet; wait for an expiration of the timer; and transmit a second AoA packet after the expiration of the timer. In certain embodiments, the memory device comprises instructions, which when executed by the processing unit, enable the tag device to receive a locator response packet, in response to the AoA packet, the wherein locator response packet comprises an indication of clock drift; and adjust the timer based on the clock drift. In certain embodiments, the memory device comprises instructions, which when executed by the processing unit, enable the tag device to transmit the sync request if the locator packet is not detected within a predetermined period of time. In certain embodiments, the memory device comprises instructions, which when executed by the processing unit, enable the tag device to retransmit the sync request if the sync response packet is not detected within a predetermined period of time.

BRIEF DESCRIPTION OF THE DRAWINGS

For a better understanding of the present disclosure, reference is made to the accompanying drawings, in which like elements are referenced with like numerals, and in which.

DETAILED DESCRIPTION

The present disclosure allows a locator device to determine the angle of arrival for a plurality of tag devices, wherein the plurality may be hundreds or even thousands of tag devices. This is achieved by segmenting the wireless channel into a plurality of time slots, where each time slot has a specific purpose. For the system to be operational, the locator device and all of the tag devices must be configured to operate according to the protocol defined herein.

Figure 1A:
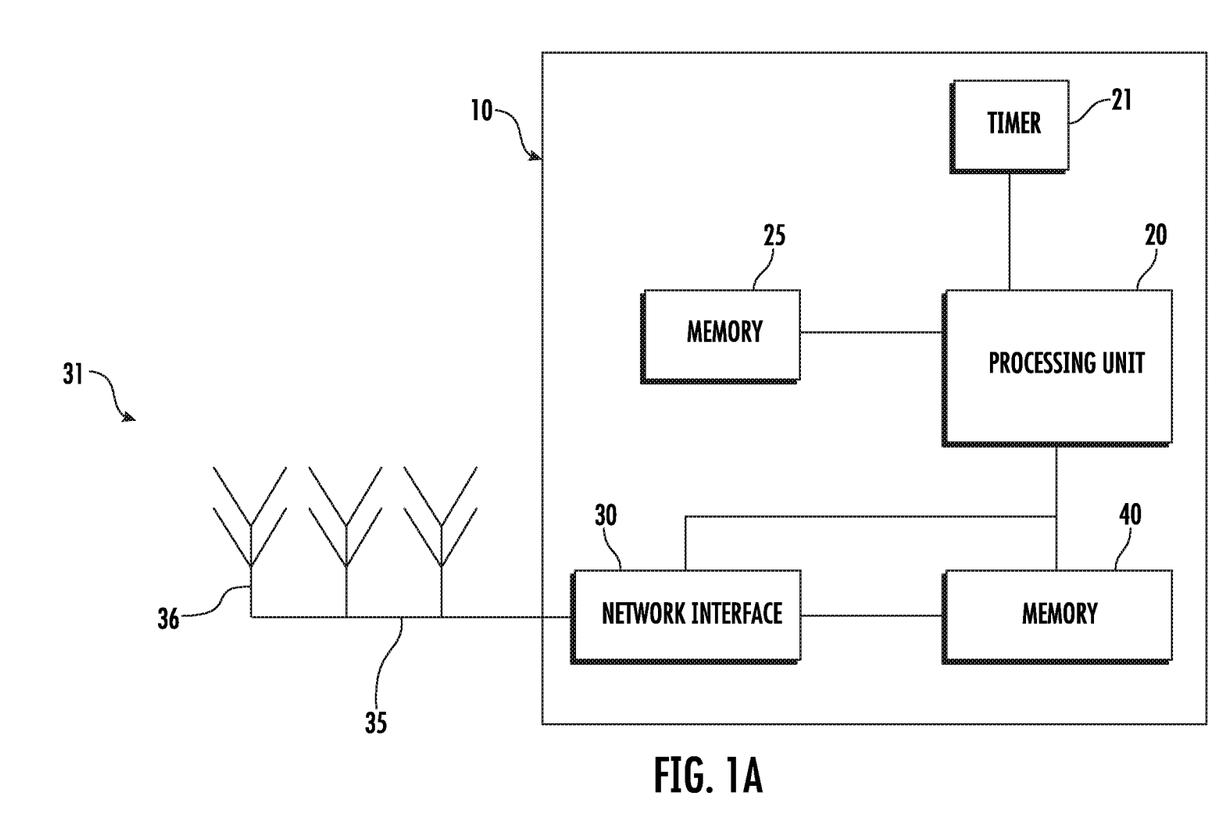
FIG. 1A is a block diagram of a representative locator device that may estimate angle of arrival for a large plurality of tag devices according to one embodiment.

FIG. 1A shows a block diagram of a representative locator device 10.

The locator device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the locator device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1A. The second computer readable non-transitory media may be a CDROM, or a different memory device, which is located remote from the locator device 10. The instructions contained on this second computer readable non-transitory media may be downloaded onto the memory device 25 to allow execution of the instructions by the locator device 10.

A timer 21 may be in communication with the processing unit 20. In some embodiments, the timer 21 may be configured to interrupt the processing unit 20. In certain embodiments, the timer 21 may be configured to wake the processing unit 20 from a low power mode.

The locator device 10 also includes a network interface 30, which may be a wireless interface including an antenna array 35.

The antenna array 35 comprises a plurality of antenna elements 36, which are arranged in a fixed, known pattern. For example, in one embodiment, the antenna array 35 may comprises a plurality of antenna elements 36 arranged in a linear fashion. In one embodiment, the same spacing is established between any two adjacent antenna elements 36. In another embodiment, the antenna elements 36 may be arranged as a two dimensional array. In one further embodiment, the spacing between any two adjacent antenna elements 36 in one direction is the same. In certain embodiments, the spacing between antenna elements 36 is related to the transmitted and received wavelengths. For example, the spacing between adjacent antenna elements 36 may be a half wavelength or less. The number of antenna elements 36 in the antenna array 35 is not limited by this disclosure.

Figure 1B:
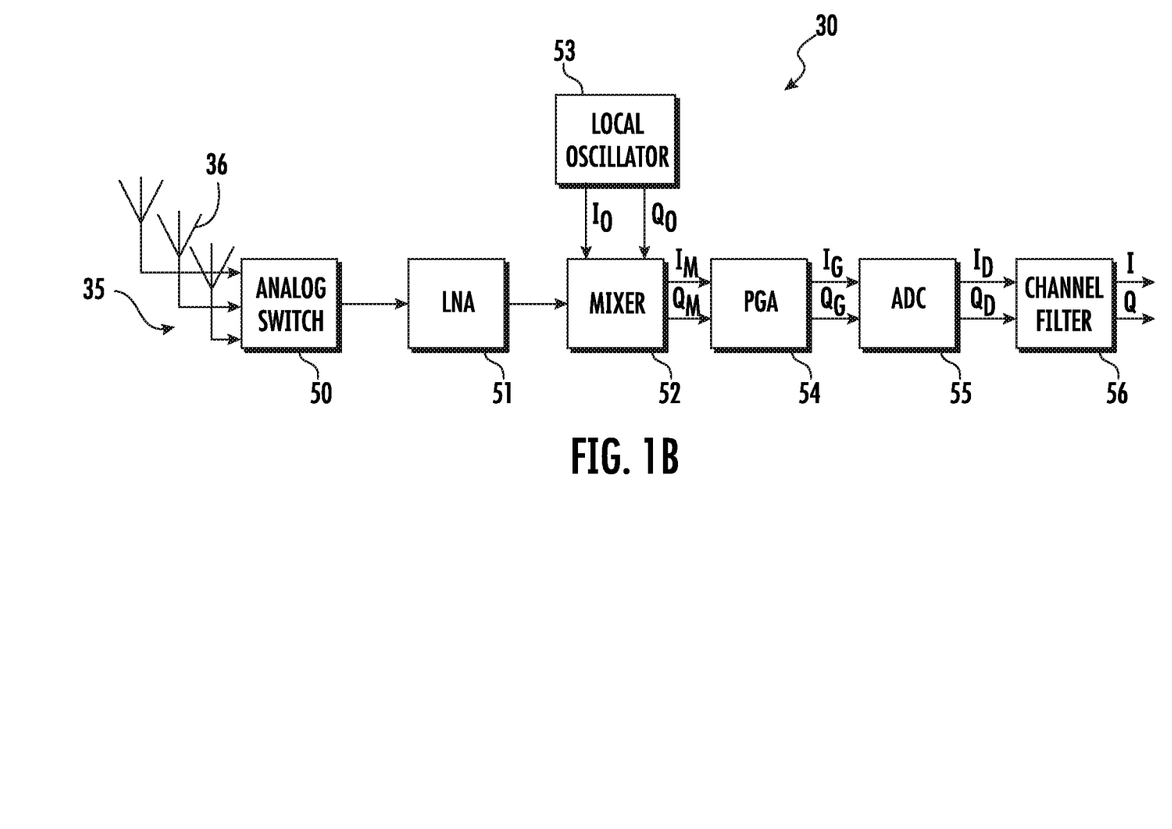
FIG. 1B is a detailed block diagram of the network interface of the locator device of FIG. 1A.

As shown in FIG. 1B, the wireless signals first enter the network interface 30 through antenna array 35. The antenna array 35 is in electrical communication with a low noise amplifier (LNA) 51. In certain embodiments, an analog switch 50 may be used to select one of the antenna elements 36 to communicate with the LNA 51. The LNA 51 receives a very weak signal from one antenna element 36 in the antenna array 35 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52, are then fed into programmable gain amplifier (PGA) 54. The PGA 54 amplifies the $I_m$ and $Q_m$ signals by a programmable amount. These amplified signals may be referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may then pass through a channel filter 56. The filtered signals are referred to as I and Q. These I and Q signals can be used to recreate the amplitude and phase of the original signal. In certain embodiments, the I and Q values maybe considered complex numbers, wherein the I value is the real component and the Q value is the imaginary component.

The I and Q signals then enter a CORDIC (Coordination Rotation Digital Computer), which determines the amplitude and phase of the signals. Amplitude is given as the square root of $I^2$ and $Q^2$, while phase is given by the $\tan^{-1}$ (Q/I). The CORDIC may be disposed in the network interface 30. In certain embodiments, the CORDIC may be implemented in software.

The analog switch 50 may then be switched so as to select a different one of the antenna elements 36 so that the above process may be repeated for each antenna element 36. In certain embodiments, rather than utilizing an analog switch, the network interface 30 may comprise a plurality of LNAs, mixers, PGAs and ADCs, so that the signals from all of the antenna elements 36 can be processed simultaneously.

The network interface 30 is used to allow the locator device 10 to communicate with other devices disposed on the wireless network 31.

Referring to FIG. 1A, the locator device 10 may include a second memory device 40 in which data that is received and transmitted by the network interface 30 is stored. This second memory device 40 is traditionally a volatile memory. The processing unit 20 has the ability to read and write the second memory device so as to communicate with the other nodes in the wireless network 31. Although not shown, the locator device 10 also has a power supply, which may be a battery or a connection to a permanent power source, such as a wall outlet.

While the processing unit 20, the timer 21, the memory device 25, the network interface 30, and the second memory device 40 are shown in FIG. 1A as separate components, it is understood that some or all of these components may be integrated into a single electronic component. Rather, FIG. 1A is used to illustrate the functionality of the locator device 10, not its physical configuration.

Figure 2:
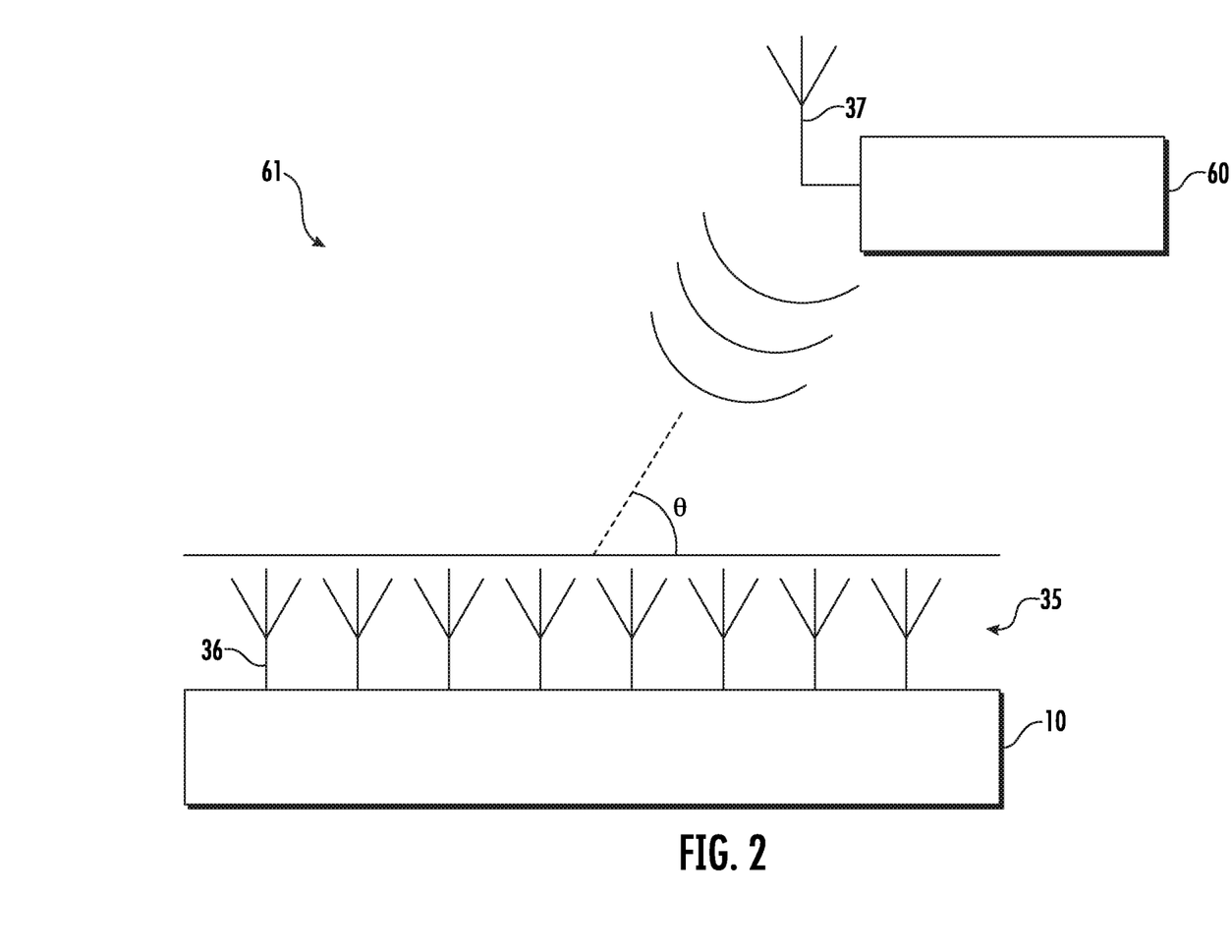
FIG. 2 shows a network having a locator device and at least one tag device according to one embodiment.

FIG. 2 shows a network 61 having at least one tag device 60 and a locator device 10. In certain embodiments, the tag device 60 may be a network device and contain many of the components described above and shown in FIG. 1A. However, the tag device 60 may not have an antenna array. Rather, the tag device 60 may utilize a single antenna element 37. Further, the tag device 60 may have a smaller amount of memory and may have less computational ability. Thus, the tag device 60 may comprise a processing unit 20, a timer 21, a memory device 25, a network interface 30, and a second memory device 40. The memory device 25 may contain instructions, that when executed by the processing unit, enable the tag device 60 to perform the functions described herein.

In FIG. 2, the tag device 60 may be transmitting a signal toward the locator device 10. This signal may be referred to as an AoA packet. In certain embodiments, this AoA packet is transmitted using any wireless network protocol, such as Zigbee or Bluetooth. The tag device 60 may be offset from the locator device 10 in the azimuth and/or elevation directions. In this particular embodiment, the tag device 60 is shown as being offset in the azimuth direction. Because of this offset, the signal from the tag device 60 will reach the antenna elements 36 on the right side of the locator device 10 before it reaches the antenna elements 36 on the left side of the locator device 10. This difference in phase can be used to determine the direction of arrival, shown as el in FIG. 2.

As stated above, the network interface 30 may support any wireless network, such as Bluetooth, Wi-Fi, networks utilizing the IEEE 802.15.4 specification, such as Zigbee, networks utilizing the IEEE 802.15.6 specification, and wireless smart home protocols, such as Z-Wave. Further, the network interface 30 may also support a proprietary or custom wireless network.

Figure 3A:
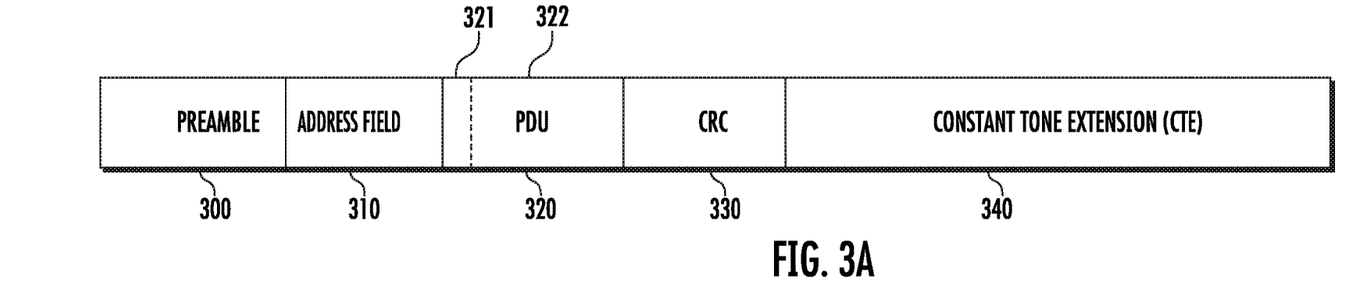
FIG. 3A-3C shows the format of a representative direction detection message transmitted to the system of FIG. 1A.
Figure 3B:
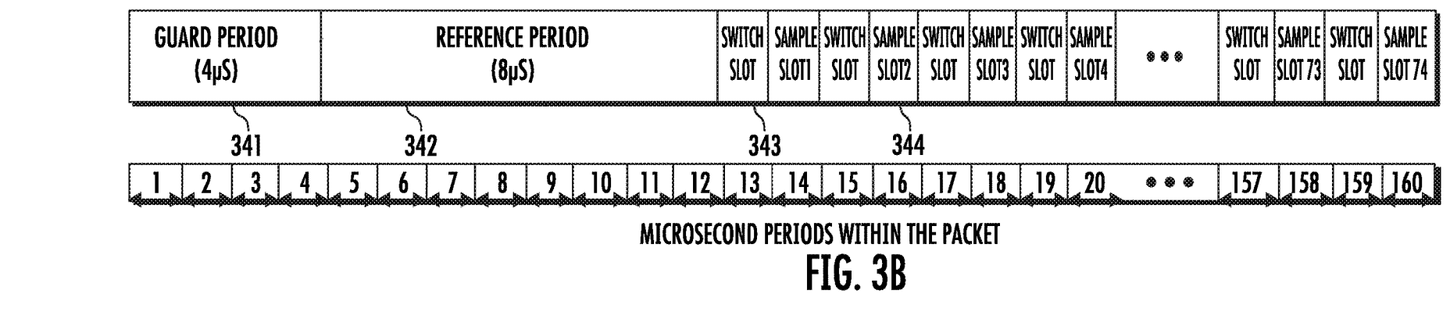
Figure 3C:
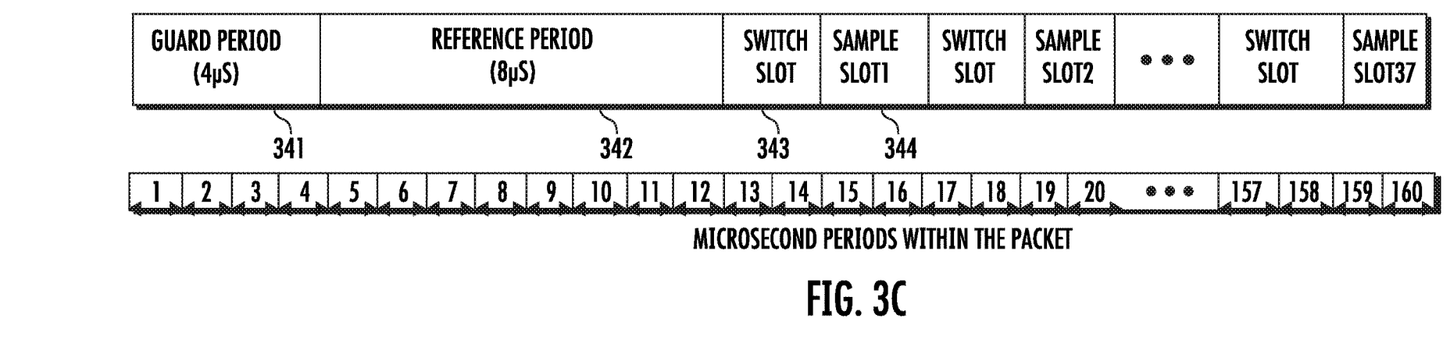

In one particular embodiment, the network interface 30 operates on a wireless network that utilizes the Bluetooth network protocol. FIG. 3A shows the format of a special Bluetooth packet that may be used for direction detection. This may be referred to as an AoA packet. These packets typically begin with a preamble 300, an address field 310, a protocol data unit (PDU) 320 and a checksum or CRC 330. The protocol data unit (PDU) 320 may be separated into two parts; a header 321 and a payload 322. In certain embodiments, the header 321 may be two bytes, while the payload 322 may have a variable length. However, the special packets also include a constant tone extension (CTE) 340. FIGS. 3B and 3C show two different formats for the CTE 340. In both formats, the CTE 340 includes a guard period 341, a reference period 342, and a plurality of switch slots 343 and sample slots 344. The duration of each switch slot 343 and sample slot 344 may be 1 μsec or 2 μsec, as shown in FIGS. 3B and 3C, respectively. The CTE 340 is a special extension to the Bluetooth packet that transmits a constant frequency, such as a 250 kHz tone. For example, the CTE 340 may be a string of consecutive "1"s. The CTE 340 may be as long as 160 μsec and as short as 16 μsec. In practice, the locator device 10 uses a single antenna element 36 of the antenna array 35 to receive the CTE 340 during the guard period 341 and the reference period 342. The locator device 10 then switches to another antenna element 36 during each switch slot 343 by changing the selection of the analog switch 50 in the radio circuit. The locator device 10 samples the tone again with that new antenna element 36 during the sample slot 344. The locator device 10 continues switching the antenna element 36 during each switch slot 343 and sampling the tone during the sample slot 344. If there are more sample slots 344 than antenna elements, the locator device 10 may return to the first antenna element 36 and repeat the sequence. One set of samples, wherein each antenna element has been used to sample the CTE 340 exactly once may be referred to as a snapshot.

During the entirety of the CTE 340, the tag device 60 is transmitting a tone at a constant known frequency. As stated above, the locator device 10 may receive that tone using one antenna element 36 of the antenna array. Specifically, the guard period 341 and the reference period 342, which have a combined duration of 12 μsec, are received using the same antenna element 36.

While the format shown in FIGS. 3A-3C are used for Bluetooth, similar packet formats may be employed for other wireless network protocols. Thus, the disclosure is not limited to Bluetooth. Rather any wireless protocol may make use of this concept.

Further, packets which are not AoA packets have a format similar to that shown in FIG. 3A, but lack the CTE 340. These packets include sync request packets, sync response packets, locator packets and locator response packets, which are described in more detail below.

The locator device 10 then performs the steps described above to generate the I and Q signals. In certain embodiments, the processing unit 20 samples the I and Q signals at a very high rate, such as 8 times or more faster than the frequency of the incoming tone. For example, if the incoming tone is 250 kHz, an oversample rate of 4.0 MHz (sixteen times oversampling) or 8.0 MHz (thirty two times oversampling) may be used. The I and Q signals then enter the CORDIC, which determines the amplitude and phase of the signals. Amplitude is given as the square root of $I^2$ and $Q^2$, while phase is given by the $\tan^{-1}$ (Q/I).

Thus, the locator device 10 may utilize the I and Q signals described above to determine the amplitude and phase of the signal arriving at each of the antenna elements 36. Many algorithms are known that compute the direction of arrival based on the phase information obtained from an antenna array 35.

For example, the multiple signal classification (MUSIC) algorithm utilizes phase information to determine the direction of arrival. The MUSIC algorithm creates a one or two dimensional graph, depending on the configuration of the antenna array, where each peak on the graph represents a direction of arrival for an incoming signal. This one or two dimensional graph may be referred to as a pseudo-spectrum. The MUSIC algorithm calculates a value for each point on the graph. Stated differently, a peak in the pseudo-spectrum corresponds to the angle of some signal entering the antenna array 35.

While this disclosure describes use of the MUSIC algorithm, other algorithms may also be used. For example, the Minimum Variance Distortionless Response (MVDR) beamformer algorithm (also referred to as Capon's beamformer), the Bartlett beamformer algorithm, and variations of the MUSIC algorithm may also be used. In each of these, the algorithms use different mathematical formulas to calculate the spectrum, but each calculates a spectrum which can be used in the present disclosure.

In certain embodiments, there may be a plurality of tag devices 60. To determine an angle of arrival for each tag device 60, the locator device 10 must receive an AoA packet from each tag device 60. While this may be manageable for a small number of tag devices 60, as the number of tag devices grows larger, the possibility of collisions between AoA packets from different tag devices 60 increases dramatically. This may make it nearly impossible for the locator device 10 to monitor large numbers of tag devices 60.

Figure 4:
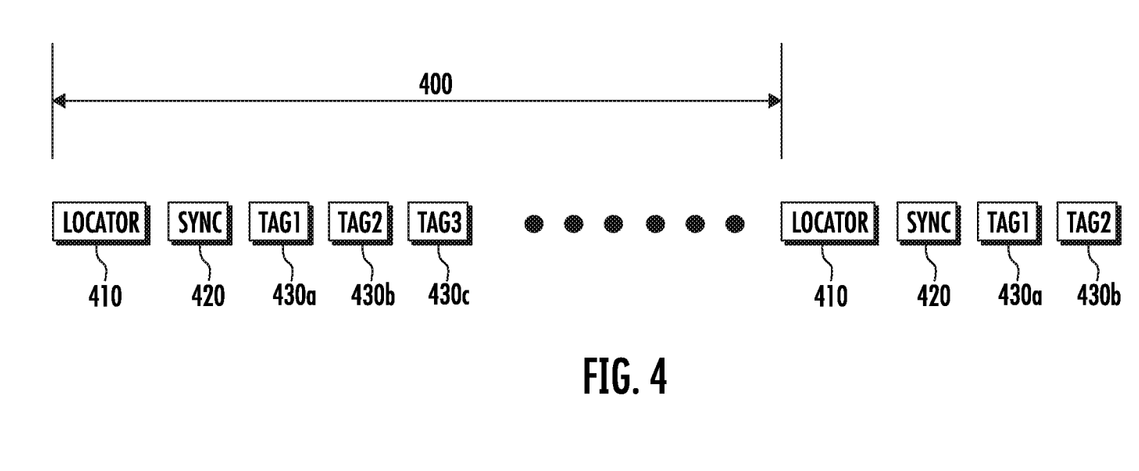
FIG. 4 shows a timing diagram of the wireless channel.

FIG. 4 shows a timing diagram that illustrates traffic on the wireless network 31 according to the present disclosure. This traffic may occur on one channel of the wireless network or may occur on multiple channels. Further, in certain embodiments, the channel or channels that are used to implement this protocol is a configuration option.

As can be seen, the wireless channel is divided into a plurality of time slots, each with a dedicated purpose. This plurality of time slots is arranged in a defined sequence, which is repeated. One such sequence may be referred to as an interval 400.

The interval 400 begins with a time slot that is allocated to the locator device 10. This time slot may be referred to as the locator time slot 410. All other time slots are referenced to this locator time slot 410. In other words, the start of all other time slots is referenced to the start of the locator time slot 410. The duration of the locator time slot 410 may be selectable. For example, in one embodiment, a fixed time, known as a slot duration, is defined. The length of the locator time slot 410 may be one slot duration. In some embodiments, the slot duration may be 1 millisecond. In another embodiment, the slot duration may be 0.6 millisecond. Of course, the slot duration may be defined to another value. Further, the interval 400 may be a predefined number of slot durations. In other words, the time from the start of one locator time slot 410 to the start of the next locator time slot 410 may be fixed, and defined as an interval duration, which is a predetermined number of slot durations.

During a locator time slot 410, the locator device 10 transmits a locator packet. This locator packet indicates that the source is the locator device. The header 321 of this locator packet may include a unique packet code that denotes the locator packet, and a length. The payload 322 may contain the slot number. In certain embodiments, the slot number may always be zero. The locator packet is used by the tag devices 60 to locate the sync slot 420. In other embodiments, this packet may be used to synchronize the clocks of all of the locator devices in a multi-locator system.

Following the locator time slot 410, there is a synchronization, or sync slot 420. As described in more detail below, the sync slot 420 is used to allow new tag devices to transmit packets. The length of the sync slot 420 may be defined as one or more slot durations. A longer sync slot 420 allows new tag devices more time to attempt to transmit and retransmit sync request packets, thereby improving the likelihood that these sync request packets will be successfully received by the locator device 10.

Following the sync slot 420, there are a plurality of tag slots 430a-430c. While three tag slots are shown, it is understood that an arbitrary number of tag slots may exist. For example, there may be tens, hundreds or thousands of tag slots. During each tag slot, one designated tag device 60 transmits its AoA packet. The assignment of each tag device 60 to a specific tag slot is described in more detail below.

Thus, in each tag slot 430a, a first designated tag device transmits its AoA packet. The header of the AoA packet includes a unique packet code that denotes the AoA packet, and a length. The payload 322 may contain information about the CTE, such as its existence, its type and its length. The payload 322 may also include the slot identifier and the tag identifier.

Similarly, in each tag slot 430b, a second designated tag device transmits its AoA packet which has the same format as that described above.

Thus, after transmitting its AoA packet, a tag device 60 is able to enter a low power state for a duration of time that is roughly equal to an interval duration less one slot duration. In other words, the tag device 60 may enter a low power state until its next assigned tag slot.

Further, after transmitting its AoA packet to the locator device 10, the tag device 60 may receive a response from the locator device 10. The locator device 10 may maintain the master clock for the wireless network 31. Thus, the locator device 10 is aware of exactly when the transmission from each tag device 60 should begin. Thus, the locator device 10 is able to calculate the difference between the expected time that the AoA packet should be sent and the actual time that the AoA packet was transmitted. The difference between these two times may be referred to as clock drift. The locator device 10 may respond to the AoA packet with a locator response packet that informs the tag device 60 of its clock drift. The tag device 60 may then use this clock drift value to adjust the time at which it will send its next AoA packet.

The selections of the slot duration and the interval duration are implementation specific. For example, in one embodiment, the slot duration is 1 millisecond, and the interval duration is 1 second. This allows almost 1000 tag devices. In another embodiment, the slot duration may be shorter, such as 0.6 milliseconds. The interval duration may be 6 seconds. This allows almost 10,000 tag devices.

Figure 5:
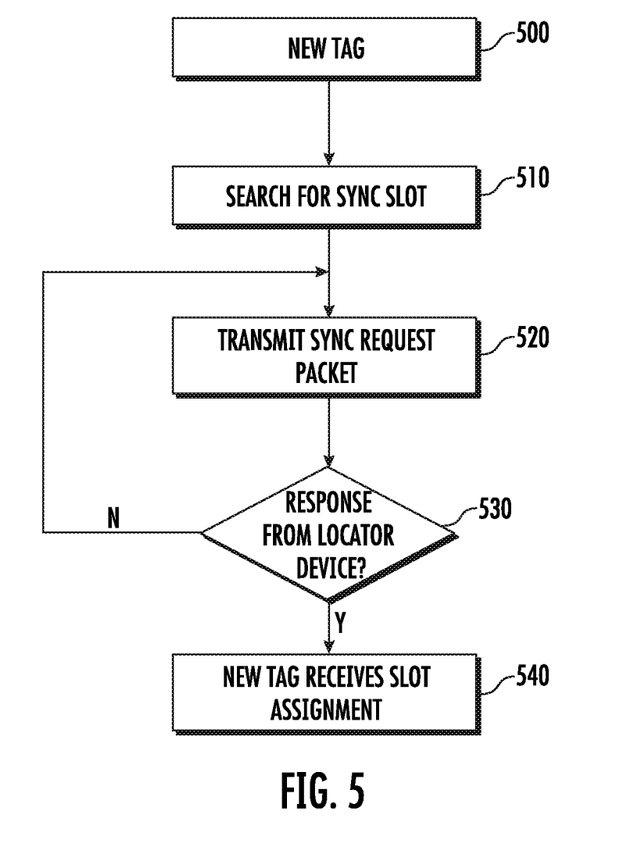
FIG. 5 shows the synchronization process.

FIG. 5 shows the operation of a new tag device and the locator device 10 during the sync slot 420. Only tag devices 60 that are not synchronized with the locator device 10 transmit packets during the sync slot 420.

First, as shown in Box 500, a new tag device becomes available. This may be a newly installed tag device or a tag device that was relocated to the region near this locator device 10. The new tag device first attempts to find the sync slot 420, as shown in Box 510. In certain embodiments, the new tag device remains active until it receives the locator packet from the locator device 10 sent in the locator time slot 410. To find the sync slot, the new tag device may monitor the channel until it receives a locator packet from the locator device 10, which it identifies as being in the locator time slot 410.

In another embodiment, each tag device 60 transmits its AoA packet with a payload 322 that includes the slot number during its designated tag slot. Thus, if the new tag device is aware of the number of slots in an interval and the slot duration, it can enter a low power state until the next sync slot 420 once it determines what slot is currently active. For example, assume that there are S slots and the new tag device receives an AoA packet from another tag device 60 indicating that it is transmitting during slot M. The new tag device can then enter a low power mode for an amount of time roughly equal to (S-M) slot durations. At the time the new tag device returns to normal operation, the locator time slot 410 may be active.

Once it determines the start of the locator time slot 410, the new tag device then transmits a sync request packet during the subsequent sync slot 420, as shown in Box 520. A sync request packet may be identified based on the packet type in the header 321 (see FIG. 3). Further, the payload 322 may contain the tag id of this new tag device.

The new tag device then waits for a response from the locator device 10, as shown in Box 530. The response may be a sync response packet. If a response is not received in a predetermined amount of time, the new tag device may retransmit the sync request packet, as shown in Box 520. In certain embodiments, the retransmission is sent immediately. In other embodiments, the retransmission may be sent after a random delay, or may be sent during the next sync slot 420. In other embodiments, the new tag device may employ a backoff mechanism, whereby one or more sync slots 420 are skipped before the new tag device retransmits the sync request packet.

If a sync response packet is received from the locator device 10, that response may contain the tag slot that has been assigned to this new tag device, as shown in Box 540. The header 321 of the sync response packet includes a unique packet type, denoting that this is a sync response packet. The payload 322 may include the tag slot id, and the tag id. In certain embodiments, the payload may include a field that denotes the amount of time from the present time until the start of the designated tag slot.

The assignment of a tag slot allows the new tag device to become synchronized with the locator device 10. For example, assume that the sync slot has a duration of N slot durations, and the locator device 10 has assigned this new tag slot number S. Since this occurred in the sync slot 420, the new tag device waits for the first tag slot 430 and then waits (S-1) slot durations before transmitting its AoA packet.

In another embodiment, as noted above, the sync response packet may provide the amount of time until the start of the new tag slot.

After the new tag device has transmitted an AoA packet during its assigned tag slot, it can then go to a low power state. The new tag device may then send its next AoA packet after waiting the interval duration.

In one variation of FIG. 5, it may be determined the amount of time that the new tag device must remain active while searching for the sync slot 420 is limited. If the new tag device does not find the sync slot 420 within this limited amount of time, the new tag device may simply transmit its sync request after a random delay. The rest of the sequence is as shown in Boxes 520-540.

Figure 6:
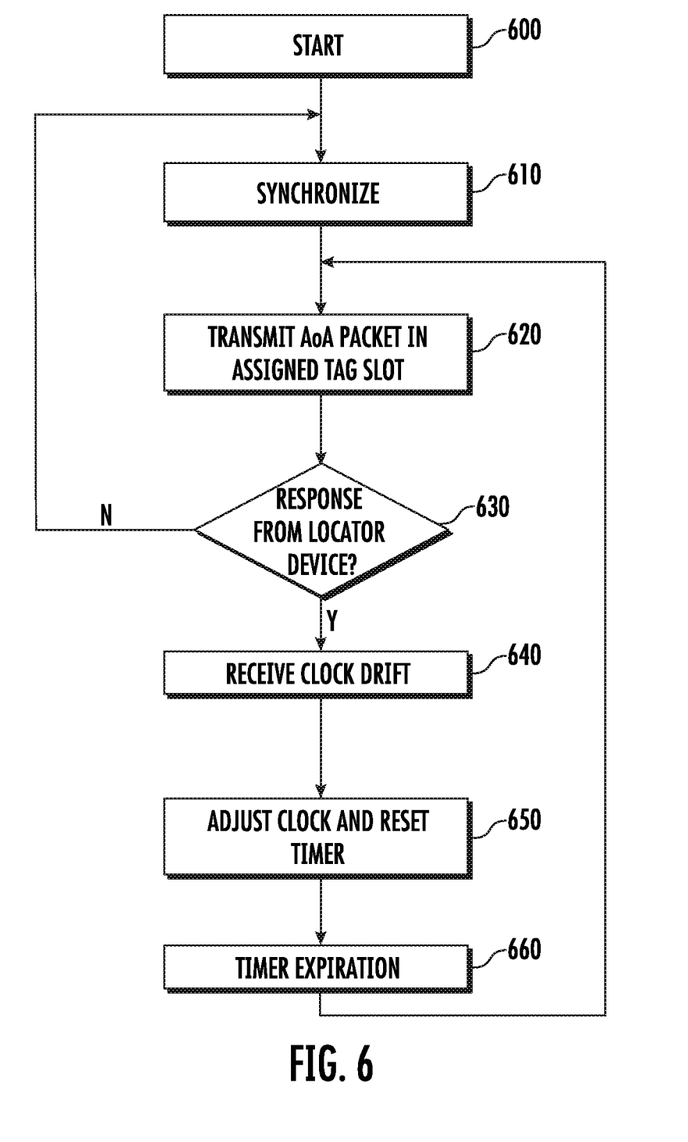
FIG. 6 shows the operation of a tag device.

FIG. 6 shows the full operation of a tag device 60. First, as shown in Box 600, the new tag device becomes available. The new tag device then initiates the synchronization process, as shown in Box 610. This synchronization process may be the one described in FIG. 5. Once synchronized, the tag device transmits an AoA packet during its assigned tag slot, as shown in Box 620. In some embodiments, the AoA packet may be similar to that shown in FIGS. 3A-3C.

The tag device 60 then waits to receive a locator response packet from the locator device 10, as shown in Box 630. In one embodiment, if a locator response packet is not received, the tag device 60 may return to the synchronization process, shown in Box 610. In certain embodiments, the tag device 60 may not return to the synchronization process until locator device 10 fails to respond to two or more AoA packets.

If a locator response packet is received from the locator device 10, the tag device parses the locator response packet to obtain the clock drift, as shown in Box 640. The header 321 of the locator response packet may include the packet type, which uniquely identifies this type of packet. The payload 322 may include the tag id and the clock drift. This clock drift value may be a signed value that indicates the difference between the master clock (maintained in the locator device 10) and the clock in the tag device. This difference may be expressed as a number of microseconds, or some other unit of time. The tag device then uses this clock drift value to adjust its clock or timer 21. For example, if the tag device transmits the AoA packet 2 microseconds later than the locator device 10 expects it, the locator device 10 may transmit a response that denotes this 2 microsecond drift. The tag device 60 may then adjust its timer value so that it expires 2 microseconds earlier for the next AoA packet.

The tag device 60 then resets its timer 21, as shown in Box 650. The tag device 60 may enter a low power state after resetting its timer. When the timer 21 expires, as shown in Box 660, the tag device then transmits an AoA packet during its assigned tag slot, as shown in Box 620.

Note that in certain embodiments, the timer 21 is set to a value that is roughly equal to the interval duration, less one slot duration. This occurs when the tag device 60 is allotted one slot. However, in certain embodiments, a tag device 60 may be assigned two or more tag slots, which may or may not be consecutive. In this case, the timer 21 is reset so that the tag device 60 transmits its next AoA packet during its next assigned slot.

Figure 7:
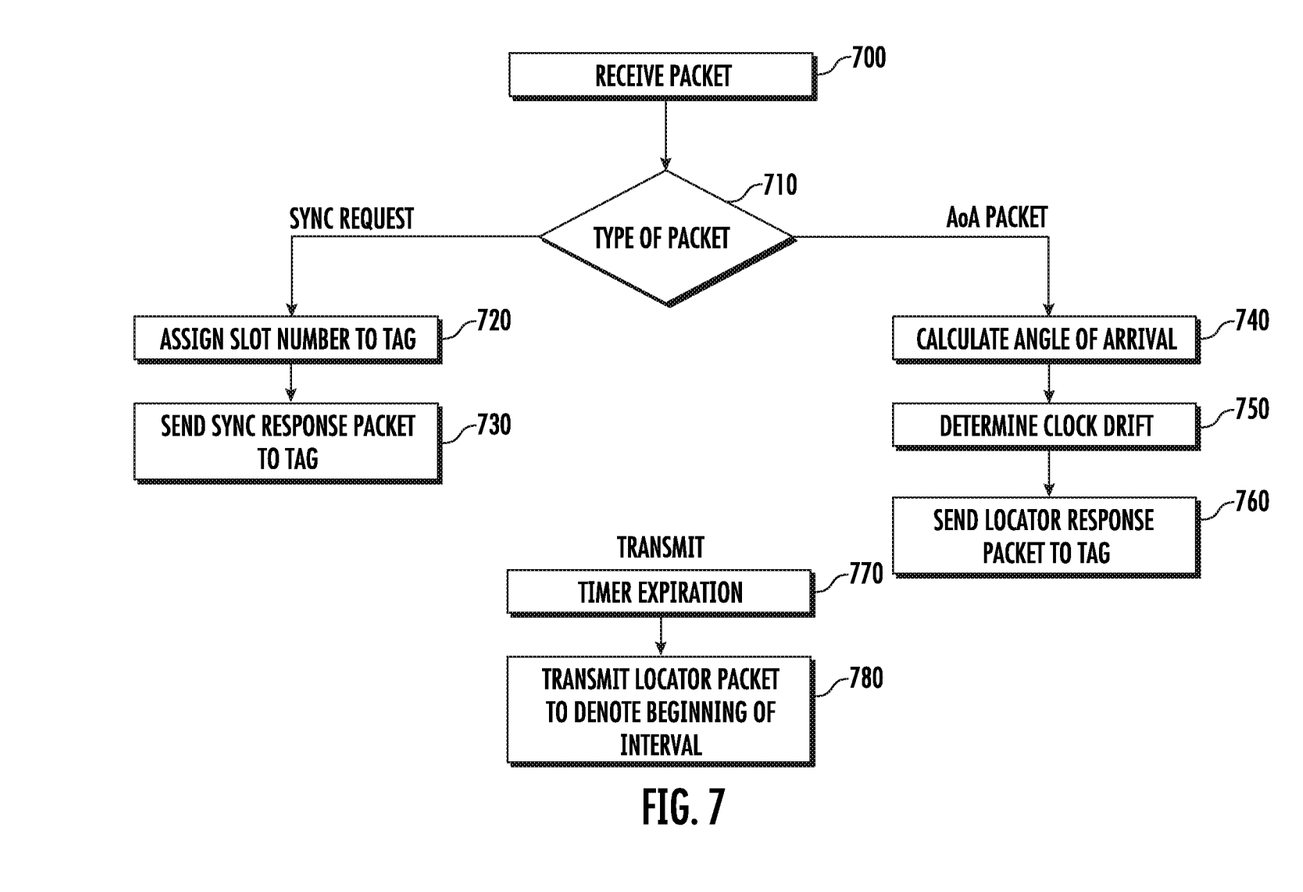
FIG. 7 shows the operation of a locator device.

FIG. 7 shows the actions of the locator device 10 in response to these actions from the tag device 60. The locator device 10 is typically always in operational mode and thus may constantly monitor the wireless channel. First, as shown in Box 700, the locator device 10 receives a packet. The locator device 10 then determines what type of packet was received based on the header 321, as shown in Box 710. If the packet is a sync request packet, the locator device 10 assigns a slot to the tag device, as shown in Box 720. This assignment process may be performed in a number of ways.

For example, in one embodiment, the locator device 10 may maintain a list of occupied slots and a list of unoccupied slots. The identity of the tag device 60 associated with each occupied slot may also be maintained. When a sync request is received, the locator device 10 may simply retrieve a slot from the list of unoccupied slots. The locator device 10 would then move this slot from the list of unoccupied slots to the list of occupied slots.

In another embodiment, the locator device 10 maintains a single list of slots. Attributes of the slots may include occupied/unoccupied status and the identity of the tag device 60 that is assigned to the slot. When a sync request is received, the locator device 10 searches the list for an unoccupied slot, designates that slot as occupied and enters the identity of the tag device 60 associated with that slot into the list.

In certain embodiments, the locator device 10 may review the list of occupied slots to determine whether it had previously performed a synchronization process with this tag device 60. If so, the locator device 10 may assign it to same slot number, or may assign it a different slot number.

Once the locator device 10 has determined the slot number for this tag device, it then transmits a sync response packet to the tag device 60, indicating the assigned slot number, as shown in Box 730.

In some cases, the incoming packet may be an AoA packet. In this case, the locator device 10 may calculate the angle of arrival, as shown in Box 740. As described earlier, using the phase detected by each antenna element 36, there are various algorithms that can be used to determine the angle of arrival.

The locator device 10 may also calculate the clock drift for this particular tag device, as shown in Box 750. The locator device establishes the slot duration and the interval duration. Therefore, the locator device 10 expects each tag device 60 to begin transmitting its AoA packet at a specific time. If the AoA packet is transmitted at a time different from that expected by the locator device 10, the locator device 10 measures the difference between the expected transmission time and the actual transmission time. This difference is referred to as clock drift. As described above, the locator device 10 may measure clock drift in microseconds, or in any other unit of time.

The locator device 10 then transmits a locator response packet to the tag device 60, as shown in Box 760. The payload 322 of this locator response packet includes the clock drift calculated above.

It is noted that the locator device 10 may include other information in the locator response packet. For example, the locator device 10 may instruct the tag device 60 to change its slot number. The locator device 10 may also assign multiple slots to this tag device 60 to allow it to transmit multiple AoA packets during each interval 400. Additionally, the locator device 10 may instruct the tag device 60 to change configuration parameters. These configuration parameters may include the channel on which packets are to be transmitted, the length of a slot duration, the length of an interval 400, and the length of the sync slot 420.

In addition to receiving packets, the locator device 10 also transmits packets. As shown in Box 770, the locator device may set a timer 21 to signify the beginning of a locator time slot 410. When the time expires, the locator device 10 transmits a locator packet, as shown in Box 780. The locator packet marks the beginning of the interval 400 and allows the new tag devices to determine the presence of the sync slot 420.

The present system has many advantages. In one test, a locator device was able to synchronize 180 tag devices in less than 1 second. This was done using an interval duration of 200 milliseconds and a slot duration of 1 millisecond. In comparison, using the current Bluetooth protocol, it takes much longer to synchronize with 180 tag devices. The Bluetooth protocol utilizes asynchronous packet transmission. Thus, a Bluetooth tag device may transmit advertising packets and AoA packets at any time. This implies that packet collision probability increases exponentially when new tag devices are added to system. Additionally, there is no concept of having dedicated sync slots, which increases synchronization time with high number of tag devices. This is because most of the time, the locator is scheduled to listen AoA packets and it does not have much time to scan new tag devices. Further, this approach allows the tag devices to be in the low power state for a greater percentage of time.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system comprising:
   a locator device, comprising a wireless network interface; and
   a plurality of tag devices, each comprising a wireless network interface;
   wherein the wireless channel is segmented into a sequence of time slots, comprising a locator time slot allocated to transmissions by the locator device, a sync slot used to allow new tag devices to transmit packets and a plurality of tag slots, wherein each of the plurality of tag devices is assigned a specific tag slot by the locator device to transmit an AoA packet in response to a sync request packet transmitted by the tag device during a previous sync slot; and
   wherein each of the tag devices transmits the AoA packet to the locator device during the specific tag slot assigned by the locator device.

2. The system of claim 1, wherein the sequence defines an interval, and the sequence is repeated a plurality of times.

3. The system of claim 2, wherein a length of each designated time slot is defined as a slot duration, and wherein the interval comprises a predetermined number of slot durations.

4. The system of claim 3, wherein a length of the locator time slot is the slot duration, and the length of the sync slot is one or more slot durations.

5. The system of claim 1, wherein a new tag device, different than the plurality of tag devices, transmits a sync request packet during the sync slot.

6. The system of claim 5, wherein the locator device responds to the sync request packet using a sync response packet, wherein the sync response packet includes the specific tag slot that the new tag device is to utilize to transmit AoA packets to the locator device.

7. A system comprising:
   a locator device, comprising a wireless network interface; and a plurality of tag devices, each comprising a wireless network interface;

wherein each of the tag devices transmits an AoA packet to the locator device during a designated time slot over a wireless channel; and wherein the locator device comprises:

the wireless network interface;

a processing unit; and a memory device in communication with the processing unit, which comprises instructions, which when executed by the processing unit, enable the locator device to:

receive an incoming packet from a first of the plurality of tag devices;

parse the incoming packet to determine if it is a sync request packet or an AoA packet; and transmit a sync response packet, assigning a designated time slot to the first of the plurality of tag devices if the incoming packet is a sync request.

8. The system of claim 7, wherein the sync response packet comprises an indication of a time from a current time to a start of the designated time slot.

9. The system of claim 7, further comprising instructions, which when executed by the processing unit, enable the locator device to:

calculate an angle of arrival of the incoming packet if the incoming packet is an AoA packet.

10. The system of claim 7, further comprising instructions, which when executed by the processing unit, enable the locator device to:

if the incoming packet is an AoA packet, determine a difference between a time that the incoming packet was received and a time that the incoming packet was expected to be received; and transmit a locator response packet to the first of the plurality of tag devices, wherein the locator response packet comprises an indication of this difference, defined as clock drift.

11. The system of claim 10, wherein the locator response packet instructs the first of the plurality of tag devices to change its designated time slot.

12. The system of claim 7, wherein the locator device transmits a locator packet to signify a beginning of an interval, the interval comprising a locator time slot, a sync slot and a plurality of tag slots.

13. A system comprising:

a locator device, comprising a wireless network interface; and a plurality of tag devices, each comprising a wireless network interface;

wherein each of the tag devices transmits an AoA packet to the locator device during a designated time slot over a wireless channel; and wherein each tag device comprises:

the wireless network interface;

a processing unit; and a memory device in communication with the processing unit, which comprises instructions, which when executed by the processing unit, enable the tag device to:

monitor a wireless channel for a locator packet;

transmit a sync request during a sync slot, following receipt of the locator packet;

receive, in response to the sync request, a sync response packet; and parse the sync response packet to determine a designated tag slot during which the tag device transmits the AoA packet.

14. The system of claim 13, further comprising instructions, which when executed by the processing unit, enable the tag device to:

transmit the AoA packet during the designated tag slot.

15. The system of claim 14, further comprising instructions, which when executed by the processing unit, enable the tag device to:

reset a timer after transmitting the AoA packet;

wait for an expiration of the timer; and transmit a second AoA packet after the expiration of the timer.

16. The system of claim 15, further comprising instructions, which when executed by the processing unit, enable the tag device to:

receive a locator response packet, in response to the AoA packet, the locator response packet comprises an indication of clock drift; and adjust the timer based on the clock drift.

17. The system of claim 13, further comprising instructions, which when executed by the processing unit, enable the tag device to:

transmit the sync request if the locator packet is not detected within a predetermined period of time.

18. The system of claim 13, further comprising instructions, which when executed by the processing unit, enable the tag device to:

retransmit the sync request if the sync response packet is not detected within a predetermined period of time.

* * * * *